(12) United States Patent
Gorokhov (10) Patent No.: US 7,817,732 B2
(45) Date of Patent: Oct. 19, 2010

(54) CHANNEL TRACKING WITH SCATTERED PILOTS

(75) Inventor: Alexei Gorokhov, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 1247 days.

(21) Appl. No.: 11/182,089

(22) Filed: Jul. 14, 2005

(65) Prior Publication Data

US 2006/0018297 A1 Jan. 26, 2006

Related U.S. Application Data

(60) Provisional application No. 60/588,599, filed on Jul. 16, 2004.

(51) Int. Cl.
*H04L 27/28* (2006.01)

(52) U.S. Cl. ........................ 375/260; 375/346

(58) Field of Classification Search ............ 375/260, 375/267, 346, 347, 349, 350
See application file for complete search history.

(56) References Cited

U.S. PATENT DOCUMENTS

| 6,904,550 | B2 * | 6/2005 | Sibecas et al. ............ 714/714 |
| 7,072,783 | B2 * | 7/2006 | Makhlouf et al. .......... 702/69 |
| 2004/0132460 | A1 * | 7/2004 | Lee ........................... 455/453 |
| 2005/0201447 | A1 * | 9/2005 | Cairns et al. .............. 375/148 |

FOREIGN PATENT DOCUMENTS

| JP | 2003-218826 | 7/2003 |
| JP | 2005151447 A | 6/2005 |
| WO | 9834381 | 8/1998 |
| WO | WO 02096049 A1 * | 11/2002 |
| WO | WO2004017586 | 2/2004 |

OTHER PUBLICATIONS

Schafhuber et al., "Kalman Tracking of Time-Varying Channels in Wireless MIMO-OFDM Systems," Institute of Communications and Radio-Frequency Engineering, Vienna University of Technology, XP010702345 (2003).
Hong He et al., "Low-Complexity Kalman Channel Estimator Structures for OFDM Systems With and Without Virtual Carriers," IEEE International Conference on Paris, France, XP010709701 (2004).
Sen et al., "Joint Channel Tracking and Symbol Detection for OFDM Systems with Kalman Filtering," AEU International Journal of Electronics and Communications, XP004959696 (2003).

(Continued)

*Primary Examiner*—David B Lugo
(74) *Attorney, Agent, or Firm*—Dmitry R. Milikovsky; Sayed H. Beladi (57) ABSTRACT

According to the disclosure, a system adapted to estimate and track a channel for wireless orthogonal frequency division modulation (OFDM) communication is disclosed. The system utilizes scattered pilot symbols being subject to channel conditions and estimates the channel value using the plurality of received pilot symbols and in accordance with correlation of the channel conditions over time.

49 Claims, 3 Drawing Sheets

OTHER PUBLICATIONS

PCT/US2005/025175, Notification of Transmittal of the International Search Report and the Written Opinion of the International Searching Authority, Mailed on Nov. 11, 2005.

Maniatis, et al., "Pilots for joint channel estimation in multi-user ofdm mobile radio systems," Spread Spectrum Techniques and Applications, 2002 IEEE Seventh International Symposium, Sep. 2, 2002, pp. 44-48, XP010615562.

International Preliminary Report on Patentability—PCT/US05/025175, IPEA/US—Alexandria, VA Apr. 6, 2007.

* cited by examiner

CHANNEL TRACKING WITH SCATTERED PILOTS

CROSS-REFERENCES TO RELATED APPLICATIONS

The present application claims benefit under 35 U.S.C. 119(e) of U.S. provisional application No. 60/588,599, filed Jul. 16, 2004, entitled "Channel Tracking with Scattered Pilots", the content of which is incorporate herein by reference in its entirety.

BACKGROUND OF THE DISCLOSURE

The present disclosure relates to wireless digital communication systems and, amongst other things, to estimation of channel characteristics and interference level in such systems.

Demand for wireless digital communication and data processing systems is on the rise. Inherent in most digital communication channels are errors introduced when transferring frames, packets or cells containing data. Such errors are often caused by electrical interference or thermal noise. Data transmission error rates depend, in part, on the medium which carries the data. Typical bit error rates for copper based data transmission systems are in the order of $10^{-6}$. Optical fibers have typical bit error rates of $10^{-9}$ or less. Wireless transmission systems, on the other hand, may have error rates of $10^{-3}$ or higher. The relatively high bit error rates of wireless transmission systems pose certain difficulties in encoding and decoding of data transmitted via such systems. Partly because of its mathematical tractability and partly because of its application to a broad class of physical communication channels, the additive white Gaussian noise (AWGN) model is often used to characterize the noise in most communication channels.

Data is often encoded at the transmitter, in a controlled manner, to include redundancy. The redundancy is subsequently used by the receiver to overcome the noise and interference introduced in the data while being transmitted through the channel. For example, the transmitter might encode k bits with n bits where n is greater than k, according to some coding scheme. The amount of redundancy introduced by the encoding of the data is determined by the ratio n/k, the inverse of which is referred to as the code rate. Codewords representing the n-bit sequences are generated by an encoder and delivered to a modulator that interfaces with the communication channel. The modulator maps each received sequence into a symbol. In M-ary signaling, the modulator maps each n-bit sequence into one of M=2n symbols. Data in other than binary form may be encoded, but typically data is representable by a binary digit sequence. Often it is desired to estimate and track the channel so as to be able to perform operations, such as channel equalization and channel-sensitive signaling.

Orthogonal frequency division modulation (OFDM) is sensitive to time-frequency synchronization. Use of pilot tones allows channel estimation to characterize the transmission pathways. Keeping transmitters synchronized with receivers reduces error rates of transmission.

BRIEF SUMMARY OF THE DISCLOSURE

In one embodiment, the present disclosure provides a system adapted to estimate and track a channel for wireless orthogonal frequency division modulation (OFDM) communication. The system comprises first and second modules. The first module is configured to receive a number of pilot symbols arbitrarily scattered between a plurality of data symbols transmitted via at least one transmit antenna. The number of pilot symbols are received via a number of taps indicative of the delay and multipath effects of the channel. The second module is configured to estimate the channel value using the plurality of received pilot symbols and in accordance with iterative correlation of the channel taps over time. The second module performs link scheduling using the channel value.

In another embodiment, the present disclosure provides a method of estimating and tracking a channel of a wireless OFDM communication system. In one step, pilot symbols are received that are scattered between data symbols transmitted via at least one transmit antenna. The pilot symbols are received via a plurality of taps indicative of the delay and multipath effects of the channel. The pilot symbols are scattered arbitrarily among at least one of time or OFDM subcarrier. The channel value is estimated using the plurality of received pilot symbols and in accordance with correlation of the channel taps over time.

In yet another embodiment, the present disclosure provides a system adapted to estimate and track a channel for wireless OFDM communication system. The system includes receiving means and estimating means. The receiving means receives pilot symbols arbitrarily scattered between a multitude of data symbols transmitted via at least one transmit antenna. The pilot symbols are received via taps indicative of the delay and multipath effects of the channel. The estimating means estimates the channel value using the plurality of received pilot symbols and in accordance with iterative correlation of the channel taps over time. The channel comprises a plurality of OFDM sub-channels.

Further areas of applicability of the present disclosure will become apparent from the detailed description provided hereinafter. It should be understood that the detailed description and specific examples, while indicating various embodiments of the disclosure, are intended for purposes of illustration only and are not intended to necessarily limit the scope of the disclosure.

DETAILED DESCRIPTION OF THE DISCLOSURE

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment of the disclosure. It being understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Estimation and tracking of a time-varying frequency-selective channel in a multi-carrier system is carried out in accordance with an algorithm that uses scattered pilot tones with arbitrary, random, pseudo-random, and/or substantially random time-frequency pattern. The pilot tones have a known modulation and coding scheme such the time that they were transmitted can be determined. The algorithm is based on a linear model that recursively estimates the channel value at any instance of time using a previous estimate of the channel together with the received values of the pilot symbols. The channel value is an indicator of the channel, for example, channel quality indicator (CQI), signal-to-noise ratio, signal strength, or any other measurement of channel sensitive signaling, including space-selective channel conditions. The algorithm uses a number of parameters representative of the channel loading, the ratio of pilot symbols to the received noise level, and the covariance matrix of the channel estimation error. The algorithm modifies such parameter values and the channel estimate until the modified parameter values and the channel estimate converge to satisfy predefined conditions. The channel value is used for link scheduling in one embodiment.

The pilot tones have a known modulation and coding scheme such that receivers do not need to necessarily know when they are being transmitted to recognize them as pilot tones. The receivers are geographically distributed across the wireless space such that they serve as taps with varying propagation delay and multipath effects from the transmitter. A channel estimate can be iteratively determined based upon analysis of the taps for the pilot tones. The channel estimate can be used for link scheduling in one embodiment.

In accordance with the present disclosure, estimation and tracking of a time-varying frequency-selective channel in a multi-carrier system is carried out using scattered pilot tones that have an arbitrary time-frequency pattern. The channel estimate is an unbiased estimate of the channel, and furthermore, the covariance matrix of the estimation error defined by the difference between the actual and the estimated value of the channel has a minimum variance. However, it is understood that there may be insubstantial variations around such estimates.

To estimate and track the channel, a linear model is assumed according to which, at any instance of time, a previous estimate of the channel together with the received values of the pilot symbols are used to estimate a new value for the channel. The pilot symbols may be part of a transmission protocol with which the wireless communication system is configured to comply and thus may be part of, e.g., the signal field. Alternatively, the pilot symbols may be extra symbols inserted between the data symbols for the purpose of estimating the channel.

In one embodiment, the system may be an OFDMA system and the initial value assigned to the channel may have a value of zero. The estimation/tracking algorithm uses, in part, a first parameter representative of the channel loading and adapted to balance contribution of the received pilot symbols with a previous estimate of the channel, a second parameter representative of the ratio of the pilot symbols to the received noise, as well as a third parameter obtained by performing a trace operation on a covariance matrix of the estimation error.

In accordance with the present algorithm, the first parameter value and the channel are updated recursively so as to arrive at new estimate values. The third parameter value is also updated to reflect the modified value of the first parameter. The modifications continue recursively until the values of the first parameter, the channel estimate, and the third parameter converge so as to meet predefined conditions.

The algorithm underlying channel estimation/tracking assumes a finite support of the time-domain response of the channel and uses the time-domain correlation of the channel response related to the known Doppler spectrum of the channel variations or an approximation thereof. The algorithm also accounts for singularities that occur in the initial phase of the channel estimation/tracking due to the limited number of the pilot symbols used. The algorithm provides a best-effort estimation of the channel state information through the limited number of the pilot symbols available on the control channels of the OFDMA reverse link. The algorithm may be used for channel sensitive scheduling such as forward link beam forming or frequency sensitive scheduling.

In accordance with the present disclosure, estimation and tracking of a time-varying frequency-selective channel in a multi-carrier system is carried out using scattered pilot tones that have an arbitrary time-frequency pattern. Scattered pilots appear at different tones over time and are substantially scattered across the band. The channel estimate is a substantially unbiased estimate. Furthermore, the covariance matrix of the estimation error defined by the difference between the actual and the estimate value of the channel has a substantially minimum variance.

The above algorithms and methods described above may be performed on a per antenna basis. Such that, the channel may be estimated for each antenna. These estimates may be utilized to obtain the spatial signature or the space-time signature of the channel. The estimates can then be utilized for providing beam forming, beam steering, or other spatial functionality.

The algorithm underlying channel estimation/tracking assumes a finite support of the time-domain response of the channel and uses the time-domain correlation of the channel response related to the known Doppler spectrum of the channel variations or an approximation thereof. The algorithm also accounts for singularities that occur in the initial phase of the channel estimation/tracking due to the limited number of the pilot symbols used. The algorithm provides a best-effort estimation of the channel state information through the limited number of the pilot symbols available on the control channels of the OFDMA reverse link. The algorithm may be used for channel sensitive scheduling such as forward link beam forming or frequency sensitive scheduling.

Figure 1:
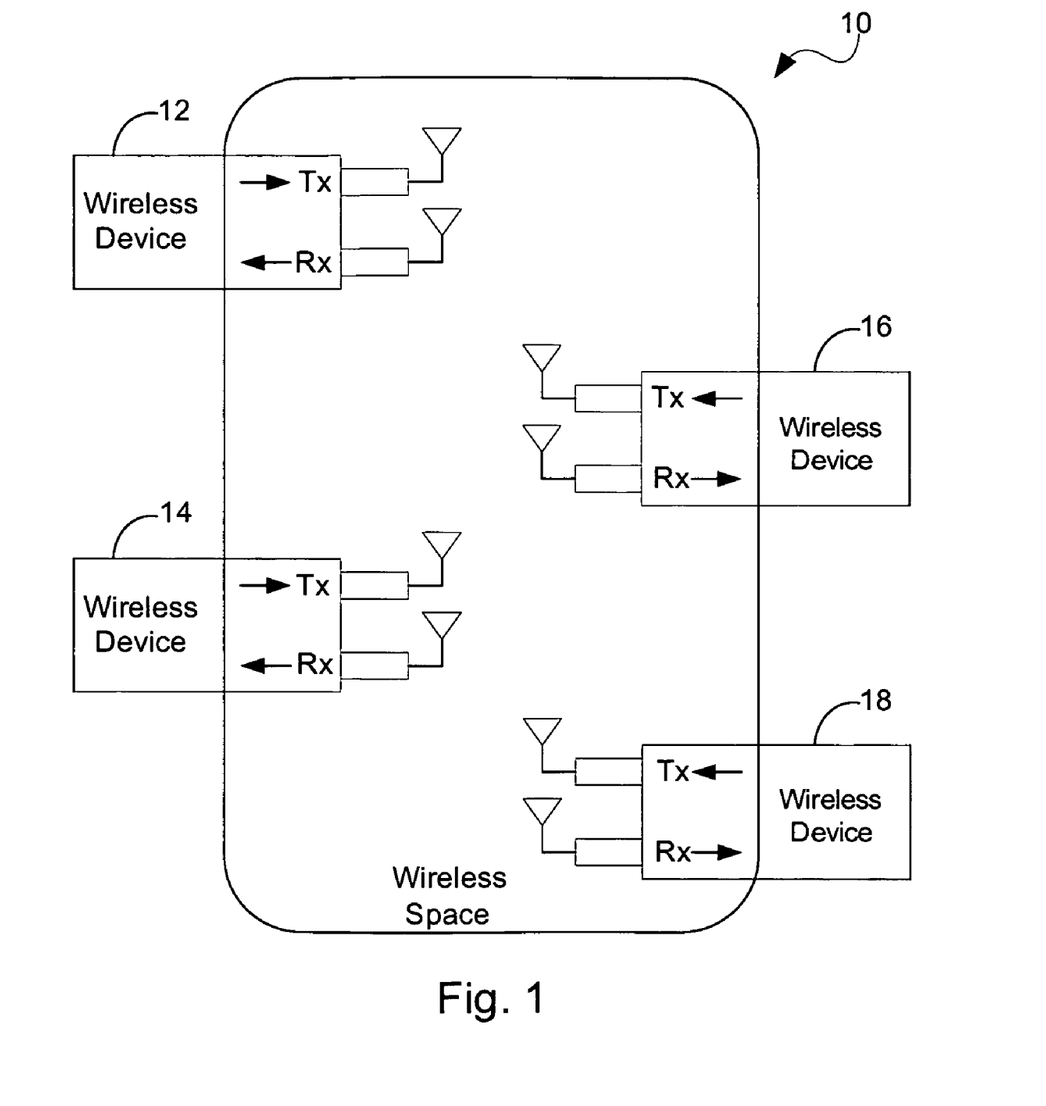
FIG. 1 shows a number of communication devices adapted to communicate via one or more wireless networks.

FIG. 1 shows an example of a wireless network 10 being used for communications among transmitters/receivers 12, 14 and transmitters/receivers 16, 18 as indicated. Each of the transmitters/receivers 12, 14, 16, 18 may have a single or multiple transmit/receive antennas (not shown). While separate transmit and receive antennas are shown, antennas may be used for both transmitting and receiving signals. The free space medium forming the channel through which the signals are transmitted is often noisy affecting the received signal. Estimates of the transmission channel's characteristics and the interference level due to noise are often made at the receiver, which indicative of the taps. Geographic location in the wireless space causes differing delays for the taps.

Figure 2:
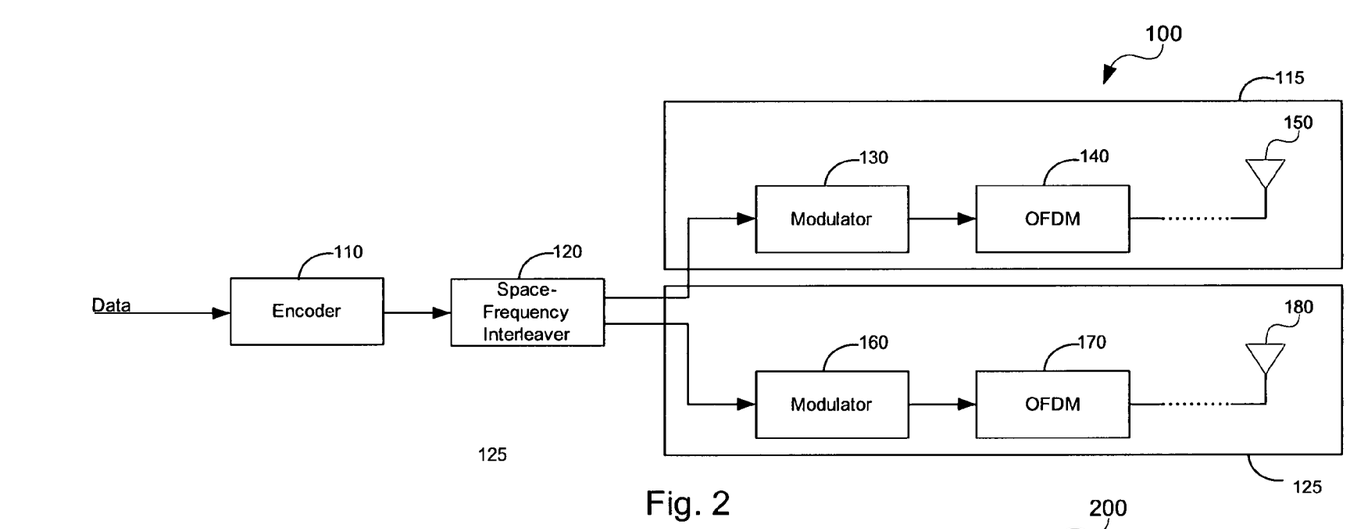
FIG. 2 is a high-level block diagram of some of the blocks disposed in the transmitting end of a wireless communication system.

FIG. 2 is a simplified block diagram of an embodiment of a transmitting end of wireless transmission system 100. Wireless transmission system is shown as including, in part, an encoder 110, a space-frequency interleaver 120, modulators 130, 160, OFDM blocks 140, 170, and transmit antennas 150, 180. Modulator 130, OFDM block 140, and transmit antenna 150 are disposed in the first transmission path 115; and modulator 160, OFDM block 170, and transmit antenna 180 are disposed in the second transmission path 125. Although the exemplary embodiment 100 of the wireless transmission system is shown as including only the two depicted transmission paths, it is understood that the wireless transmission system 100 may include more than two transmission paths. The data transmitted by the transmit antennas 150, 180 are received by one or more receive antennas of a wireless receive system. For example, pilot symbols and data symbols are transmitted on various sub-carriers of the OFDM channel.

Figure 3:
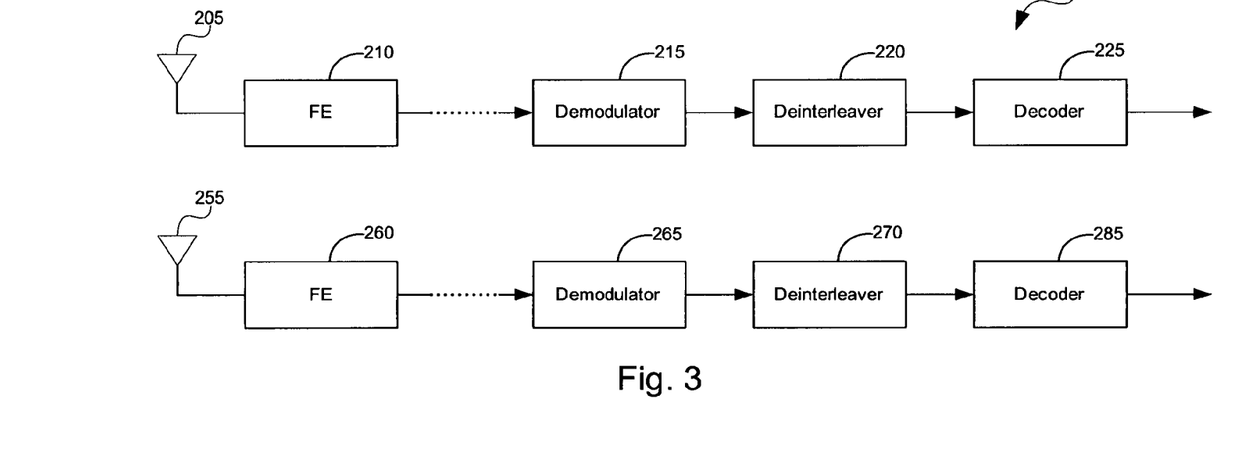
FIG. 3 is a high-level block diagram of some of the blocks disposed in the receiving end of a wireless communication system.

FIG. 3 is a simplified block diagram of an embodiment of a receiving end of a wireless receiving system 200. Wireless receiving system 200 is shown as including, in part, receive antenna 205, 255, front-end blocks 210, 260, demodulators 215, 265, space-frequency deinterleavers 220, 270, and decoders 225, 285. Wireless receiving system 200 is shown as including a pair of receive transmission paths, it is understood that the wireless transmission system 200 may include more than two transmission paths. Pilot symbols and data symbols are received by the wireless receiving system 200. Each transmission path is related to a particular sub-carrier. Analysis of the pilot symbols iteratively over time allows characterizing the channel.

Further, the estimates may be iteratively performed for each receiver chain, e.g. a separate estimate for receptions at antenna 205 and 255. This allows for the channel to be estimated for each spatial channel between the transmitter and receiver. The estimates may be utilized, e.g. combined, to obtain the spatial signature or the space-time signature of the channel from the different channels for each antenna. The estimates can then be utilized for providing beam forming, beam steering, or other spatial functionality.

Figure 4:
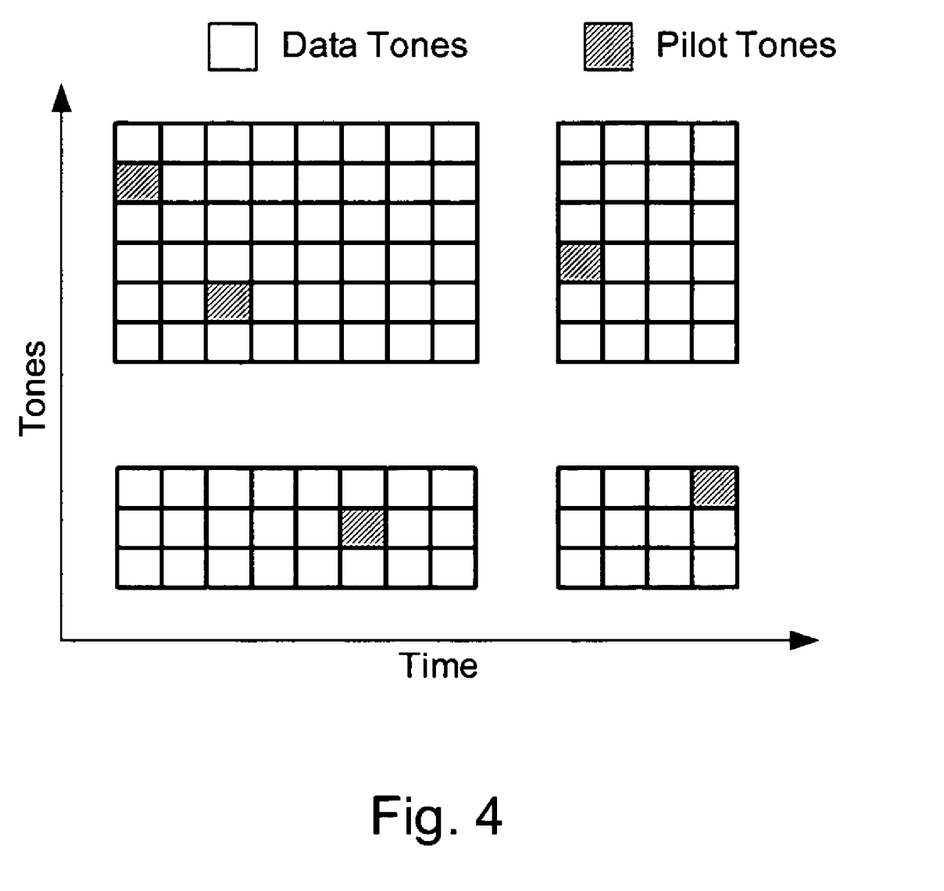
FIG. 4 shows a multitude of pilot symbols disposed between data symbols to enable estimation/tracking of channel characteristics, in accordance with the present disclosure.

Assume an OFDM or OFDMA transmission with N orthogonal tones that are spaced by $f_s$. Assume further that the transmitter sends pilot symbols over a certain time frequency pattern known to the receiver, as shown in FIG. 4. In the following, it is assumed the total number of different pilot tones N in the time-frequency pattern is greater than or equal to the number of taps L of the channel, i.e., $N \geq L$. Such a pilot pattern enables estimation of a baseband channel response with up to L taps. In the following analysis, the effect of the excess delay is assumed negligible. It is also assumed that the channel variations over the OFDMA symbol duration $T_s = 1/f_s$ is also negligible, and that the noise is a AWGN. Assume that the channel $h_k$ is represented by the following expression:

$$h_k = [h_k[0], h_k[l_1], \ldots h_k[l_{L-1}]]^T$$

Channel $h_k$ is thus a L×1 vector of channel taps with relative delays $l_1, \ldots, l_{L-1}$ for any given time instance $t_k$. The time instance may be representative of the channel update step, a single OFDMA symbol duration, slot or frame duration, etc. Assume further that the channel is a time-varying channel having a scalar complex Gaussian first order channel process, as shown below in expression (1):

$$h_k = r_k h_{k-1} + \sqrt{1-r_k^2}\,\xi_k,\ \xi_k \sim N_c(0, I_L), \quad (1)$$

In expression (1), $N_c(\bullet,\bullet)$ represents a complex circular Gaussian vector specified by its mean and covariance matrix respectively, and $I_{\bullet}$ is an ($\bullet \times \bullet$) identity matrix. It is further assumed that the process is stationary over a tracking interval so that $r_k$, defined by the following expression:

$$r_k = r(t_k - t_{k-1})$$

may be obtained from the channel variation model, e.g., its Doppler spectrum. It is assumed that $r_k$ is known.

The signal $x_k$ received at step k may thus be defined as shown below in expression (2):

$$x_k = pH[m_k] + \eta_k,\ \eta_k \sim N_c(0, l), \quad (2)$$

where $p^2 = (E_p/N_0)$ represents the pilot-to-noise ratio, $H[m_k]$ represents the channel frequency response corresponding to the pilot tone with index $m_k$, where ($0 \leq m_k < N$), and $\eta_k$ represents the observation noise. The channel frequency response may be rewritten as shown below:

$$H[m_k] = w_k^H h_k$$

$$w_k = w(m_k)$$

$$w(m) = [1, e^{j2\pi f_s m l_1}, e^{j2\pi f_s m l_2}, \ldots, e^{j2\pi f_s m l_{L-1}}]^T \quad (3)$$

where $w_k$ represents the direction of the pilot tone with index $m_k$.

In the above, it is assumed that there is one tone per step, thus enabling the channel estimate to be updated with only one pilot observation per step, which in turn, reduces the complexity of channel estimation/tracking. It is understood, however, that when multiple tones are observed at once, there may be multiple steps corresponding to the same time instance t (e.g. $t_k = t_{k-1} = \ldots$). The estimate $\hat{h}_k$ of the channel at step k is defined by the following expression:

$$\hat{h}_k = [\hat{h}_k[0], \hat{h}_k[l_1], \ldots, \hat{h}_k[l_{L-1}]]^T$$

Because it is assumed that the channel is Gaussian, its estimate $\hat{h}_k$ is also Gaussian. The channel estimator, in accordance with the present algorithm, is unbiased and has a minimum variance. In the most general case, this enables the expected value of $\hat{h}_k$ to coincide with the projection of the true channel $h_k$ onto the subspace spanned by the directions $w_k$ of pilot tones used in the estimation/tracking throughout the step k. In the startup phase, this condition ensures that no noise is collected in the subspace where no channel information is available. In the steady state when the present/past pilots span the entire L-dimensional space, this condition provides the following expression:

$$E\{\hat{h}_k\} = h_k$$

Accordingly, the channel estimate may be defined as below:

$$\hat{h}_k \Box N_c(P_k h_k, Q_k) \quad (4)$$

where $P_k$ is the projector onto the subspace spanned by the available pilot directions, as shown below:

$$\text{span}\{P_k\} = \text{span}\{w_1, K, w_k\}$$

and $Q_k$ is the covariance matrix of the estimation error $_\Delta h_k = (\hat{h}_k - P_k h_k)$.

The variance of the estimate of the channel response $H[m]$ corresponding to $\hat{h}_k$ and evaluated at data tones $m \in \Omega_D$ is represented below by $\hat{H}_k[m]$, and the present algorithm seeks to minimize the average variance of $\hat{H}_k[m]$. The following expression (5) applies to a multicarrier system:

$$|\Omega_D|^{-1} \sum_{m \in \Omega_D} |\hat{H}_k[m] - H[m]|^2 \xrightarrow{N_D \to \infty} Tr\{Q_k\}. \quad (5)$$

The exact equality in expression (5) holds when the set $\Omega_D$ of data tones coincides with the whole set of tones: $\Omega_D = \{1, \ldots, N\}$. The asymptotic equivalent in expression (5) holds whenever the data tones are evenly distributed over the whole spectrum. With an appropriate design of the time-frequency pilot pattern and assuming a wide sense stationary channel process, the estimation/tracking provides a steady phase covariance matrix $Q_\infty$ which equals a scaled identity, thereby ensuring the minimum worst case variance in the steady phase.

Linear estimate of $\hat{h}_k$ of $h_k$ combines the pilot observation $x_k$ as well as the estimate $\hat{h}_{k-1}$ obtained at the previous step and is defined as shown below in expression (6)

$$\hat{h}_k = A_k w_k x_k + r_k B_k \hat{h}_{k-1} \quad (6)$$

Using expressions (1)-(4), linear estimate $\hat{h}_k$ may be written as below:

$$\hat{h}_k = \underbrace{\frac{(\rho A_k w_k w_k^H + B_k P_{k-1}) h_k}{\text{mean value}}}_{} + \underbrace{\left(A_k w_k \eta_k + r_k B_k \Delta h_k - \sqrt{1-r_k^2} B_k P_{k-1} \xi_k\right)}_{\text{error}} \quad (7)$$

Linear estimator (7) is shown as including expressions representative of the mean and error values. Assume without loss of generality that $A_k$ is full rank. Accordingly $A_k$ may further be defined as follows:

$$A_k = (\rho w_k w_k^H + A_k^{-1} B_k P_{k-1})^\# \quad (8)$$

where $\bullet^\#$ denotes Moore-Penrose pseudo inverse operator. To simplify the estimation algorithm further, assume a class of linear estimators defined as shown below:

$$B_k = \gamma_k A_k \quad (9)$$

where the loading parameter $\gamma_k$ is a non-negative scalar that balances the contribution by the current pilot against those by the previous channel estimate $\hat{h}_{k-1}$. This simplification avoids the computational complexity. Linear estimator $\hat{h}_k$ may thus be written as shown below:

$$\hat{h}_k = (\rho w_k w_k^H + \gamma_k P_{k-1})^\# (w_k x_k + \gamma_k r_k \hat{h}_{k-1}) \quad (10)$$

An update rule for $\gamma_k$ and the resulting estimation accuracy quantified by $Tr\{Q_k\}$ is developed below, where $Q_k$ is the covariance matrix of the error term in expression (7), and Tr is a trace operator. Using expressions (1), (2), (4), (7),(9) and (10), the following recursion is obtained:

$$Q_k = A_k(w_k w_k^H + \gamma_k^2 r_k^2 Q_{k-1} + \gamma_k^2 (1-r_k^2) P_{k-1}) A_k \quad (11)$$

$$A_k = (\rho w_k w_k^H + \gamma_k P_{k-1})^\# \quad (12)$$

To determine a value for $\gamma_k$ during the startup phase, it is assumed that $P_{k-1} < I_L$ in expression (11). It is also assumed that in the startup phase, every pilot tone contributes with a new direction to the channel estimate; this condition requires the following:

$$m_k \notin \{m_1, \ldots, m_{k-1}\}$$

$$\text{span}\{P_{k-1}\} \subset \text{span}\{P_k\}, K=1, \ldots, L.$$

thus leading to the following result:

$$\Delta_k^2 = Tr\{Q_k\} \quad (13)$$

$$= (1-r_k^2)L + r_k^2 Tr\{Q_{k-1}\} + \frac{w_k^H((1-r_k^2)I_L + r_k^2 Q_{k-1}) w_k}{w_k^H(I_L - P_{k-1}) w_k}$$

Expression (13) is invariant with respect to the loading parameter $\gamma_k$. A single observation (e.g. $x_k$) can provide an estimate of a single degree of freedom. In the startup phase, appending an extra pilot results in adding an extra direction to the channel estimate since the inclusion $\text{span}\{P_{k-1}\} \subset \text{span}\{P_k\}$ takes place. In other words, the value of $x_k$ is transformed into the estimate of the scaling applied to the orthogonal projection of the normalized version of $w_k$ onto the subspace which is the orthogonal complement of $P_{k-1}$ to the entire space. Since the old estimate $\hat{h}_{k-1}$ is within the span of $P_{k-1}$, the balancing between the new pilot contribution and the old estimate has no effect. This enables loading factor $\gamma_k$ to be chosen arbitrarily in the startup phase. In particular, $\gamma_k$ may be selected so as to have a relatively small value. One advantage of such values for $\gamma_k$ is the elimination of pseudo-inverse operations, as shown below:

$$(\rho w_k w_k^H + \gamma_k P_{k-1})^\# (w_k x_k + \gamma_k r_k \hat{h}_{k-1}) \xrightarrow{\gamma_k \to 0}$$

$$(\rho w_k w_k^H + \gamma_k I_L)^{-1} (w_k x_k + \gamma_k r_k \hat{h}_{k-1}).$$

Linear estimator $\hat{h}_k$ may thus be written as shown below:

$$\hat{h}_k = (\rho w_k w_k^H + \gamma_k I_L)^{-1} (w_k x_k + \gamma_k r_k \hat{h}_{k-1}). \quad (14)$$

where the loading $\gamma_k$ is set to a small value in the startup phase, where $k=1, \ldots, L$.

The matrix inversion operation in expression (14) may be efficiently carried out due to the matrix inversion lemma. The resulting simplified update of the estimator $\hat{h}_k$ is shown in following expression (15) that is used to provide an estimate of and track the channel:

$$\hat{h}_k = \left(I_L - \frac{\rho \beta_k}{1+\rho \beta_k L} w_k w_k^H\right)(\beta_k x_k w_k + r_k \hat{h}_{k-1}), \quad (15)$$

where $\beta_k = \gamma_k^{-1}$. Selection of the loading factor $\gamma_k$, or equivalently $\beta_k = \gamma_k^{-1}$, during the steady phase k>L is described first. After performing relevant algebra, an analog of expression (13) in the steady phase provides the following recursions:

$$Q_k = \frac{(1-\mu_k)^2}{\rho^2 L} \Pi_k + (\Pi_k^\perp + \mu_k \Pi_k)(r_k^2 Q_{k-1} + (1-r_k^2) I_L)(\Pi_k^\perp + \mu_k \Pi_k) \quad (16)$$

where:

$$\mu_k = \frac{1}{1+\beta_k L}, \quad (17)$$

$$\Pi_k = \|w_k\|^{-2} w_k w_k^H,$$

$$\Pi_k^\perp = I_L - \Pi_k$$

The exact minimization of $\mathrm{Tr}\{Q_k\}$ with respect to parameter $\beta_k$ is complicated because of the non-trivial relationship between the eigenstructure of $Q_k$ and the structure of the projectors $\Pi_k$ and $\Pi_k^\perp$. As described above, in a steady mode, $Q_k$ should converge to a scaled identity matrix, based on the assumptions of the time-frequency structure of the pilot and stationary channel process. Over any substantial number of steps, pilot tones are evenly distributed over the signal bandwidth. Specifically, it is assumed that for any $k_0 = 1, 2, \ldots$, the following condition applies:

$$1/M \sum_{k=k_0+1}^{k_0+M} w_k w_k^H \xrightarrow{M \to \infty} I_L. \quad (18)$$

Condition (18) is statistically satisfied (i.e. with probability one) when a pseudo-random pilot pattern is used. With respect to the channel process, it is assumed that $r_k$ converges to a fixed $r_\infty$ as k increases. In many instances, it may be assumed that $r_k$ is constant, i.e., $r_k=r$. In other instances, e.g., variable update time, $r_k$ may vary.

Assume that the sequence $\{w_k\}$ is a process with the identity covariance matrix. It can be shown that any quadratic form $v^H Q_k v$, where $\|v\|^2=1$), under the minimum trace criterion and the update rule (15), is a monotonic (non-increasing) sequence which is lower bounded by zero. Hence $v^H Q_k v$ converges to a certain limit. The limits are the same for different v. Two other observations are made. First, a steady phase in the following form may be considered for $Q_k$:

$$Q_k = \Delta_k^2 I_L \quad (19)$$

This enables rewriting the recursion (16) with respect to $Q_k$ as an approximate recursion with respect to $\Delta_k^2$, as shown below:

$$\Delta_k^2 I_L \approx (r_k^2 \Delta_{k-1}^2 + 1 - r_k^2) \Pi_k^\perp + ((r_k^2 \Delta_{k-1}^2 + 1 - r_k^2)\mu_k^2 + (1-\mu_k)^2 \rho^{-2} L^{-1}) \Pi_k \quad (20)$$

or equivalently $$\Delta_k^2 L \approx (r_k^2 \Delta_{k-1}^2 + 1 - r_k^2) + ((r_k^2 \Delta_{k-1}^2 + 1 - r_k^2) \mu_k^2 + (1-\mu_k)^2 \rho^{-2} L^{-1}) \quad (21)$$

wherein the approximation is expected to be accurate in the steady phase.

It is desired to find $\beta_k = \gamma_k^{-1}$, corresponding to $\mu_k$ defined in expression (17), such that it would lead to the minimum of (21). Nearly optimal $\beta_k$ and the corresponding $\Delta_k^2$ may be obtained as shown below:

$$\beta_k = \rho^{-2}(r_k^2 \Delta_{k-1}^2 + 1 - r_k^2)^{-1} \quad (22)$$

$$\Delta_k^2 = \rho^{-2} \beta_k \left(1 - \frac{\beta_k}{1+\beta_k L}\right) \quad (23)$$

The recursions defined by (22)-(23) are used to update the factor $\beta_k$. Together with expression (15), this recursion provides estimation and tracking of the channel. The steady phase estimation error $\Delta_\infty^2$ may be determined by substituting recursion (22) into (23), which yields the following result:

$$\Delta_\infty^2 = (r_\infty^2 \Delta_\infty^2 + 1 - r_\infty^2) \left(1 - \frac{\rho^{-2}(r_\infty^2 \Delta_\infty^2 + 1 - r_\infty^2)}{1 + \rho^{-2} L (r_\infty^2 \Delta_\infty^2 + 1 - r_\infty^2)}\right) \quad (24)$$

It can be shown that expression (24), which is quadratic with respect to $\Delta_\infty^2$, has a single positive root. A closed form solution to expression (24) may be found. Table I provides a summary of channel estimation/tracking procedure described above in a pseudo-code form:

TABLE I $\beta = \beta_0$;
for k = 1 to L $$\hat{h} := \left(I_L - \frac{\rho \beta}{1+\rho \beta L} w_k w_k^H\right)(\beta x_k w_k + r_k \hat{h});$$

end
$\Delta^2 = \Delta_0^2$;
while tracking is on $$\beta := \rho^{-2}(r_k^2 \Delta^2 + 1 - r_k^2)^{-1};$$

$$\hat{h} := \left(I_L - \frac{\rho^2 \beta}{1+\rho^2 \beta L} w_k w_k^H\right)(\beta x_k w_k + r_k \hat{h});$$

$$\Delta^2 := \rho^{-2} \beta \left(1 - \frac{\beta}{1+\beta L}\right);$$

end

The two parameters to be specified are $\beta_0$ and $\Delta_0^2$. A relatively large value may be selected for $\beta_0$ (relatively small value for $\gamma_0 = \beta_0^{-1}$) while ensuring a numerically stable algorithm. The value of $\Delta_0^2$ reflects the magnitude of the estimation error at the end of the startup phase. The covariance matrix $Q_k$ may be different from an identity matrix at the end of the startup phase, hence selection of $\Delta_0^2$ will always be an approximation except for a few special cases, such as when $w_1, \ldots, w_L$ are orthogonal and channel variations through the startup phase can be considered negligible. For very slow varying channels, the magnitude of the error will be proportional to $\rho^{-2} L^{-1}$.

It is also possible to choose the initial error at the same level as the actual channel, i.e., by setting $\Delta_0^2 = 1$. Such a choice is generally more reliable because the estimation accuracy at the end of the startup phase may vary depending on the particular sequence $m_1, \ldots, m_L$ of pilots in the startup phase. A relatively large value for $\Delta_0^2$ will result in a somewhat slower convergence of the tracking procedure, recognizing that convergence speed may not be the overriding factor for the best effort acquisition of the channel state information. It is understood, however, that an optimal selection of $\Delta_0^2$ may be provided given the set $m_1, \ldots, m_L$.

Table 2 further simplifies the pseudo-code of Table I. Table II uses a common initialization and does not distinguish between the startup phase and the steady phase. This simplification has no effect on the steady phase.

TABLE II $\Delta^2 = 1$;
while tracking is on $$\beta := \rho^{-2}(r_k^2 \Delta^2 + 1 - r_k^2)^{-1};$$

$$\hat{h} := \left(I_L - \frac{\rho^2 \beta}{1 + \rho^2 \beta L} w_k w_k^H\right)(\beta x_k w_k + r_k \hat{h});$$

$$\Delta^2 := \rho^{-2} \beta \left(1 - \frac{\beta}{1 + \beta L}\right);$$

end

Proper characterization of the channel process, shown in expression (24), depends on the Doppler spectrum of channel variations. Specifically, $$r_k = r(t_k - t_{k-1}), \quad r(\tau) = \int_{-\infty}^{\infty} S_D(f) e^{i2\pi f \tau} df, \quad (25)$$

where $S_D(f)$ is the power spectral density of channel variations which typically depends on the velocity of a mobile terminal as well as the propagation environment. One conventional model assumes a fixed velocity and rich scattering in the vicinity of a mobile terminal, with the uniform azimuth distribution. The corresponding Doppler spectrum, known as the U-shaped spectrum, is defined as following:

$$S_D(f) = \begin{cases} \frac{1}{\pi f_D \sqrt{1 - (f/f_D)^2}}, & |f| \le f_D \\ 0, & |f| > f_D \end{cases} \quad (26)$$

where $f_D = f_c v_m / c$ with carrier frequency $f_c$, mobile speed $v_m$ and $c = 3 \cdot 10^8$ m/s.

Another conventional model assumes a uniform spectrum defined below:

$$S_D(f) = \begin{cases} \frac{1}{2 f_D}, & |f| \le f_D \\ 0, & |f| > f_D \end{cases} \quad (27)$$

The time-frequency pilot pattern used herein is defined by the following expression:

$$k = \sum_{i=0}^{N-1} a_{i,k} 2^i \Rightarrow m_k = \sum_{i=0}^{N-1} a_{i,k} 2^{N-1-i} \quad (28)$$

Such a pattern ensures a uniform coverage of the entire bandwidth over any limited time period, thereby enabling the estimation and tracking of fast varying channels.

The channel estimation and tracking may be carried out using various codes of one or more software modules forming a program and executed as instructions/data by, e.g., a central processing unit, or using hardware modules specifically configured and dedicated to determine the channel and interference level. Alternatively, the channel estimation may be carried out using a combination of software and hardware modules.

The above embodiments of the present disclosure are illustrative and not limiting. Various alternatives and equivalents are possible. The disclosure is not limited by the type of encoding, decoding, modulation, demodulation, combining, eigenbeamforming, etc., performed. The disclosure is not limited by the number of channels in the transmitter or the receiver. The disclosure is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A method of estimating and tracking a channel of a wireless orthogonal frequency division modulation (OFDM) communication system, the method comprising:
    receiving a plurality of pilot symbols scattered between a plurality of data symbols transmitted via at least one transmit antenna, wherein:
        said plurality of pilot symbols being subject to channel conditions, and
        said plurality of pilot symbols are scattered arbitrarily among at least one of time or OFDM sub-carrier;
    estimating the channel value using the plurality of received pilot symbols and in accordance with correlation of the channel conditions over time, the channel estimate value being defined by a first parameter adapted to balance contribution of the plurality of received pilot symbols with a previous estimate of the channels, a second parameter defined by a ratio of the plurality of received pilot symbols to a received noise level, and a third parameter defined by performing a trace operation on a covariance matrix of an estimation error.

2. The method of claim 1 wherein the plurality of pilot symbols are distributed in a substantially random time-frequency pattern.

3. The method of claim 1 further comprising a step of forward scheduling using the channel value.

4. The method of claim 1 wherein said plurality of pilot symbols are scattered evenly among a plurality of sub-carriers over time.

5. The method of claim 1 wherein the estimating step uses a Kalman type filter to determine the channel value in an iterative manner.

6. The method of claim 1 wherein the estimating step uses a Kalman type filter to determine the channel value in an iterative manner without performing matrix inversion.

7. The method of claim 1 wherein the channel value indicates a measurement of channel sensitive signaling.

8. The method of claim 1 wherein the channel value is defined by an initial value assigned to the channel.

9. The method of claim 8 wherein the initial value assigned to the channel value is zero.

10. The method of claim 1 further comprising:
assigning an initial value to the first parameter.

11. The method of claim 10 further comprising
assigning an initial value to the third parameter, and
wherein the estimation error is defined by a difference between the actual and the estimate value of the channel.

12. The method of claim 11 further comprising:
performing a first modification step to modify the value of the first parameter in accordance with the value of the third parameter;
performing a second modification step to modify the channel estimate value in accordance with the modified value of the first parameter;
performing a third modification step to modify the value of the third parameter in accordance with the modified value of the first parameter; and
continuing to perform the first, second, and third modification steps until the values of each of the first parameter, the channel estimate, and third parameter converge to levels satisfying associated predefined conditions.

13. The method of claim 12 further comprising:
assigning an initial value of one to the third parameter.

14. The method of claim 12 wherein the channel estimate value satisfying the associated predefined condition is a substantially unbiased estimator of the channel.

15. The method of claim 14 wherein the covariance matrix of the estimation error is a substantially minimum variance estimator.

16. The method of claim 1 wherein said plurality of pilot symbols are symbols transmitted as part of a transmission protocol with which the wireless communication system is configured to comply.

17. The method of claim 16 wherein the channel estimate value is further defined by the frequency response of the channel.

18. An apparatus adapted to estimate and track a channel for wireless OFDM communication, the apparatus comprising:
an antenna configured to receive a plurality of pilot symbols arbitrarily scattered between a plurality of data symbols transmitted via at least one transmit antenna, wherein said plurality of pilot symbols are received subject to various time delays along the channel; and
a processing unit configured to:
estimate the channel value using the plurality of received pilot symbols and in accordance with iterative correlation of the time delays over time, the channel estimate value being defined by a first parameter adapted to balance contribution of the plurality of received pilot symbols with a previous estimate of the channel, a second parameter defined by a ratio of the plurality of received pilot symbols to a received noise level, and a third parameter defined by performing a trace operation on a covariance matrix of an estimation error, and perform link scheduling using the channel estimate value.

19. The apparatus of claim 18 wherein the wireless communication system is an OFDMA communication system.

20. The apparatus of claim 18 wherein the plurality of pilot symbols are subject to various taps at different times.

21. The apparatus of claim 18 wherein the plurality of pilot symbols are recognizable as pilot symbols by at least one of modulation or encoding.

22. The apparatus of claim 18 wherein the plurality of pilot symbols is randomly scattered in at least one of:
time sent on a particular OFDM sub-carrier, or
the OFDM sub-carrier chosen.

23. The apparatus of claim 18 wherein the processing unit is further configured to estimate the channel value using a Kalman type filter to determine the channel value in an iterative manner.

24. The apparatus of claim 18 wherein the channel estimate value is defined by an initial value assigned to the channel.

25. The apparatus of claim 18
wherein the processing unit is further configured to assign an initial value to the first parameter.

26. The apparatus of claim 25
wherein the processing unit is further configured to assign an initial value to the third parameter and the estimation error is defined by a difference between the actual and the estimate value of the channel.

27. The apparatus of claim 26 wherein:
the processing unit is further configured to perform a first modification step to modify the value of the first parameter in accordance with the value of the third parameter;
the processing unit is further configured to perform a second modification step to modify the channel estimate value in accordance with the modified value of the first parameter;
the processing unit is further configured to perform a third modification step to modify the third parameter value in accordance with the modified value of the first parameter; and
the processing unit is further configured to continue to perform the first, second, and third modification steps until the values of each of the first parameter, the channel estimate, and the third parameter converge to levels satisfying associated predefined conditions.

28. The apparatus of claim 27
wherein the processing unit is further configured to assign an initial value of one to the third parameter.

29. The apparatus of claim 28 wherein the channel estimate value is further defined by the frequency response of the channel.

30. The apparatus of claim 26 wherein the covariance matrix of the estimation error is a substantially minimum variance estimator.

31. The apparatus of claim 18 further comprising at least two antennas and wherein the processing unit estimates the channel value for each of the at least two antennas separately.

32. An apparatus adapted to estimate and track a channel for wireless OFDM communication system, the apparatus comprising:
means for receiving a plurality of pilot symbols arbitrarily scattered between a multitude of data symbols transmitted via at least one transmit antenna, wherein said plurality of pilot symbols are received with various time delays along the channel; and
means for estimating the channel value using the plurality of received pilot symbols and in accordance with iterative correlation of the time delays over time, wherein the channel estimate value is defined by a first parameter adapted to balance contribution of the plurality of received pilot symbols with a previous estimate of the channel, a second parameter defined by a ratio of the plurality of received pilot symbols to a received noise level, and a third parameter defined by performing a trace operation on a covariance matrix of an estimation error, and wherein the channel comprises a plurality of OFDM sub-channels.

33. The apparatus of claim 32 wherein the estimating step uses a Kalman type filter to determine the channel value in an iterative manner.

34. The apparatus of claim 32 wherein the plurality of pilot symbols are scattered arbitrarily among at least one of time or OFDM sub-carrier.

35. The apparatus of claim 32 further comprising means for link scheduling using the channel value.

36. The apparatus of claim 32 wherein the channel estimate value is defined by an initial value assigned to the channel.

37. The apparatus of claim 36 wherein the initial value assigned to the channel is zero.

38. The system of claim 32 further comprising:
means for assigning an initial value to the first parameter.

39. The apparatus of claim 38 further comprising:
means for assigning an initial value to the third parameter, and wherein the estimation error is defined by a difference between the actual and the estimate value of the channel.

40. The apparatus of claim 39 wherein the covariance matrix of the estimation error is a substantially minimum variance estimator.

41. The apparatus of claim 32 further comprising:
means for performing a first modification step to modify the value of the first parameter in accordance with the value of the third parameter;
means for performing a second modification step to modify the channel estimate value in accordance with the modified value of the first parameter;
means for performing a third modification step to modify the value of the third parameter in accordance with the modified value of the first parameter; and
means for continuing to perform the first, second, and third modification steps until the values of each of the first parameter, the channel estimate, and the third parameter converge to levels satisfying associated predefined conditions.

42. The system of claim 41 further comprising:
means for assigning an initial value of one to the third parameter.

43. The apparatus of claim 32 wherein the channel estimate value is further defined by the frequency response of the channel.

44. The apparatus of claim 32 wherein the apparatus comprises at least two antennas and wherein the means for estimating the channel value comprises means for estimating the channel value for each of the plurality of the at least two antennas separately.

45. A tangible computer media encoded with a computer readable program for executing the program for estimating and tracking a channel of a wireless orthogonal frequency division modulation (OFDM) communication system, the computer program including instructions for:
receiving a plurality of pilot symbols scattered between a plurality of data symbols transmitted via at least one transmit antenna, wherein:
said plurality of pilot symbols being subject to channel conditions, and
said plurality of pilot symbols are scattered arbitrarily among at least one of time or OFDM sub-carrier;
estimating the channel value using the plurality of received pilot symbols and in accordance with correlation of the channel conditions over time, the channel estimate value being defined by a first parameter adapted to balance contribution of the plurality of received pilot symbols with a previous estimate of the channel, a second parameter defined by a ratio of the plurality of received pilot symbols to a received noise level, and a third parameter defined by performing a trace operation on a covariance matrix of an estimation error.

46. A tangible computer media encoded with a computer readable program for executing the program for estimating and tracking a channel of a wireless orthogonal frequency division modulation (OFDM) communication system, the computer program including instructions for:
receiving a plurality of pilot symbols arbitrarily scattered between a multitude of data symbols transmitted via at least one transmit antenna, wherein said plurality of pilot symbols are received with various time delays along the channel; and
estimating the channel value using the plurality of received pilot symbols and in accordance with iterative correlation of the time delays over time, wherein the channel estimate value is defined by a first parameter adapted to balance contribution of the plurality of received pilot symbols with a previous estimate of the channel, a second parameter defined by a ratio of the plurality of received pilot symbols to a received noise level, and a third parameter defined by performing a trace operation on a covariance matrix of an estimation error, and wherein the channel comprises a plurality of OFDM sub-channels.

47. The tangible computer media of claim 46 wherein the computer program further comprising instrucion for:
assigning an initial value to the first parameter.

48. The tangible computer media of claim 47, wherein the computer program further comprising instrucion for:
assigning an initial value to the third parameter, and wherein the estimation error is defined by a difference between the actual and the estimate value of the channel.

49. The tangible computer media of claim 46, wherein the computer program further comprising instructions for:
performing a first modification step to modify the value of the first parameter in accordance with the value of the third parameter;
performing a second modification step to modify the channel estimate value in accordance with the modified value of the first parameter;
performing a third modification step to modify the value of the third parameter in accordance with the modified value of the first parameter; and
continuing to perform the first, second, and third modification steps until the values of each of the first parameter, the channel estimate, and the third parameter converge to levels satisfying associated predefined conditions.

* * * * *